United States Patent [19]
Chatterjea

[11] 3,964,372
[45] June 22, 1976

[54] CLUTCH CYLINDER CIRCUIT AND CHARGING VALVE THEREFOR

[75] Inventor: Probir K. Chatterjea, Des Plaines, Ill.

[73] Assignee: International Harvester Company, Chicago, Ill.

[22] Filed: June 6, 1974

[21] Appl. No.: 477,128

Related U.S. Application Data

[62] Division of Ser. No. 347,096, April 2, 1973.

[52] U.S. Cl. .................................. 91/471; 91/468; 138/43; 192/109 F; 251/126
[51] Int. Cl.² ................. F15B 11/08; F15B 13/042
[58] Field of Search ............ 251/126; 91/471, 468; 138/43; 192/109 F

[56] References Cited
UNITED STATES PATENTS

| | | | |
|---|---|---|---|
| 1,373,829 | 4/1921 | Perdue | 138/43 |
| 3,018,041 | 1/1962 | Bidwell | 251/126 X |
| 3,566,716 | 3/1971 | Chatterjea | 192/109 F |

*Primary Examiner*—Irwin C. Cohen
*Attorney, Agent, or Firm*—John W. Gaines; Floyd B. Harman

[57] ABSTRACT

Hydraulic mechanism in a transmission for engaging a clutch for forward or reverse before a clutch for first, second, or third speed. Flow of pressure fluid to the latter clutch is by way of a quick fill spool having a large orifice, a rate of rise spool, and a poppet therein having a small orifice. A restricted orifice of appreciable, helically turned length is used in connection with the spools and the poppet in such a way that, after the power unit for the clutch for first, second, or third speed is filled with fluid, pressure of the fluid in the power unit is raised at controlled rate to its maximum.

1 Claim, 7 Drawing Figures

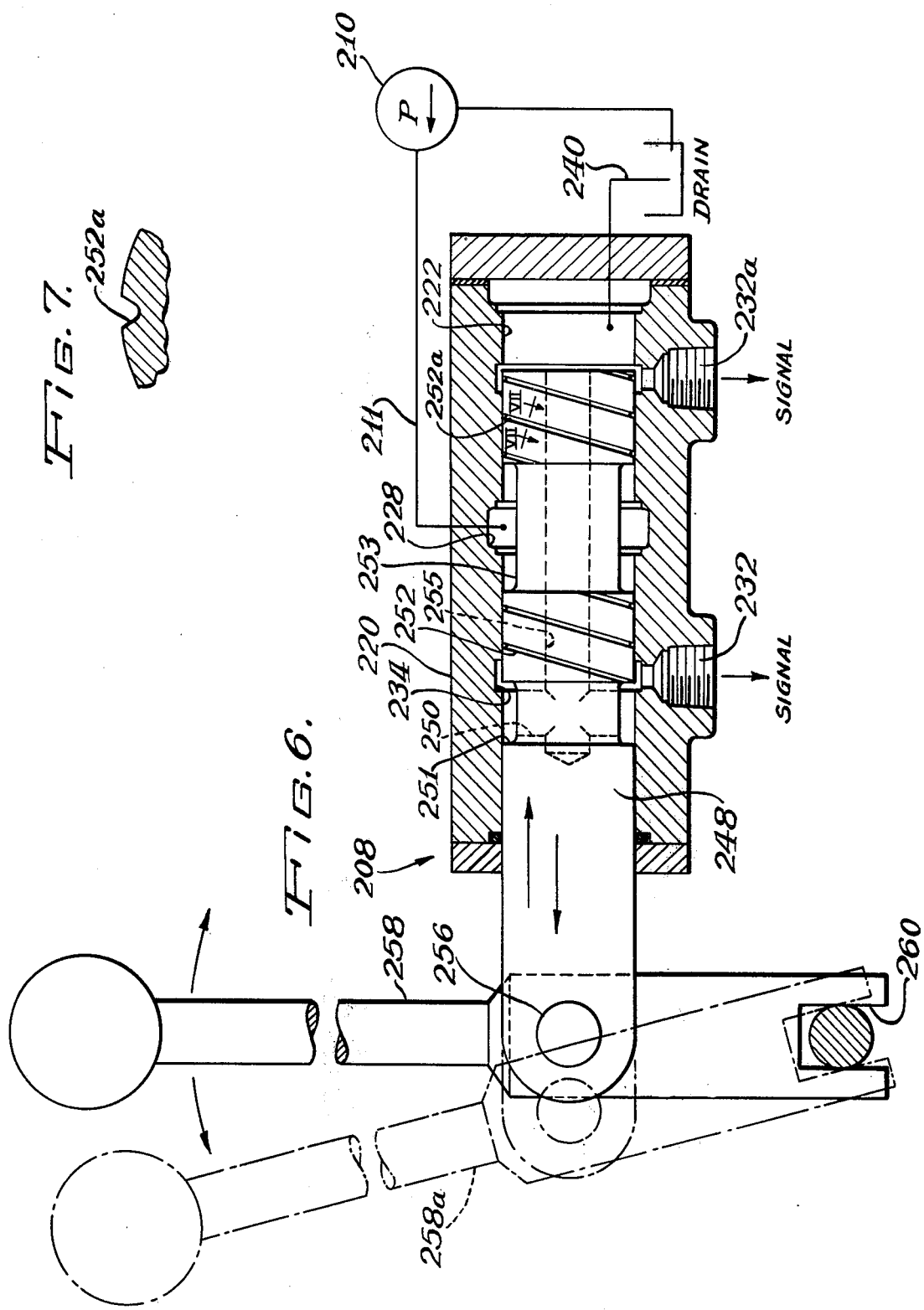

CLUTCH CYLINDER CIRCUIT AND CHARGING VALVE THEREFOR

This application is related to my U.S. Pat. No. 3,566,716 and is a division of a pending application Ser. No. 347,096 filed Apr. 2, 1973, which pending application discloses my novel hydro-potentiometer including a variable restriction for pressure taps, and claims the hydro-potentiometer per se.

This invention relates to the control of hydraulic fluid for operating the power units for clutches of an automotive transmission. More specifically, the invention relates to a sequenced actuation of power cylinders for clutches of a tractor transmission.

It is desirable in the operation of a tractor to control the so-called direction clutches for forward and reverse from the same transmission control circuit as the so-called range clutches for first, second, and third speeds and to set the control both for direction and for speed at the same time. Yet the selected direction clutch should be fully engaged before the selected speed clutch in order to avoid certain undesirable conditions in the operation of the tractor transmission. It is proposed to accomplish the aforesaid sequenced engagement of the clutches by the use of a delaying mechanism in the supply of hydraulic fluid to the cylinder for the speed clutch.

My invention thus has a two-fold purpose: to make engagement of one clutch in a transmission power train without delay, and subsequently to make engagement of a second clutch in the same train substantially shock free and yet without unnecessary delay.

My invention specifically provides an improved procedure to make the shock free engagement of the second clutch, wherein a quick fill and slack take-up step takes place therein by a preliminarily directed substantial flow of fluid in a first path to the second clutch, followed by the steps of production and application of a signal responsive to flow of pressure fluid in the first path so as initially to insert a major portion of the length of a long helically turned restriction in the path, directing the flow in a second fluid path from the remaining portion of the restriction to drain, and production and application of a signal responsive to the flow of pressure fluid in the first path so as slowly and progressively to decrease the portion of the length of the restriction in the first named fluid path and increase the restriction in the second fluid path to a point at which the major portion of the restriction length is included in the second fluid path.

One important structural feature in connection with the foregoing is that the first path includes a pressure tap point on the restriction which can be placed at different distances from that one end of the length of the restriction which is connected to drain, in turn providing a significant procedural feature characterized by the step of linear placement of the tap point on the length of the restriction so that at each distance thereof from said one end the tapped off pressure will be generated as a linear function of the distance of the tap line from the end.

The convenient hydraulic analogy of a valve to control the current of fluid flowing is not applicable. Nor is there any valid circuit analogy to two complementary variable resistors which are in circuit connected to one another and to ground or drain at one end in common, and which are utilized simply for the ratio produced thereby as between the resistance drop from the outer end of one resistor to the common end thereof and the resistance drop from the outer end of the other resistor to the common end thereof. Actually, an electrical potentiometer tap and a linear potentiometer engaged thereby are the closest analogy because the tap line hereof taps off precise fluid pressures, much the same as controlled electrical potential is provided but not the same as controlled flow of fluid (by adjustable valve), current (by variable resistor), or the like.

In one physically constructed embodiment of the invention, given at this point by way of an example of times and pressures and exemplary of a use to which the invention is primarily adapted, the clutch fill pressure was 30 psi and the clutch engagement pressure was 250 psi. The quick fill and slack take-up step for the second clutch, i.e., the selected speed clutch, took 0.1 second between start and completion under 30 psi clutch cylinder pressure as the first stage of operating the second clutch. The second stage followed without interruption and took 0.6 second from a start at 30 psi to completion of the full second clutch engagement at 250 psi.

In line with the foregoing, an object of my invention is to provide an hydraulic control mechanism through which full flow of pressure fluid is provided at the outset for quick filling of an hydraulic power unit and a restricted connection is inserted to slow the buildup of pressure in the hydraulic power unit while part of the pressure fluid is bypassed to drain. Total flow is negligible in the restricted connection.

Although primarily adapted for use as just mentioned, my hydro potentiometer invention will be appreciated to have broader application as a wave signal generator, productive of one pressure output varying linearly with position or with movement in one direction, or two seperate outputs varying linearly with position or with movement in opposite directions from a neutral position. An infinity of servo pressure levels is thus provided in a linearly varying range.

Other objects, and features and advantages will appear from the following description and the accompanying drawings which show certain preferred embodiments of my invention and in which:

FIGS. 6 and 7 are longitudinal and transverse cross sectional views of a two-spool modification of more general application as a pressure signal generator.

Figure 1:
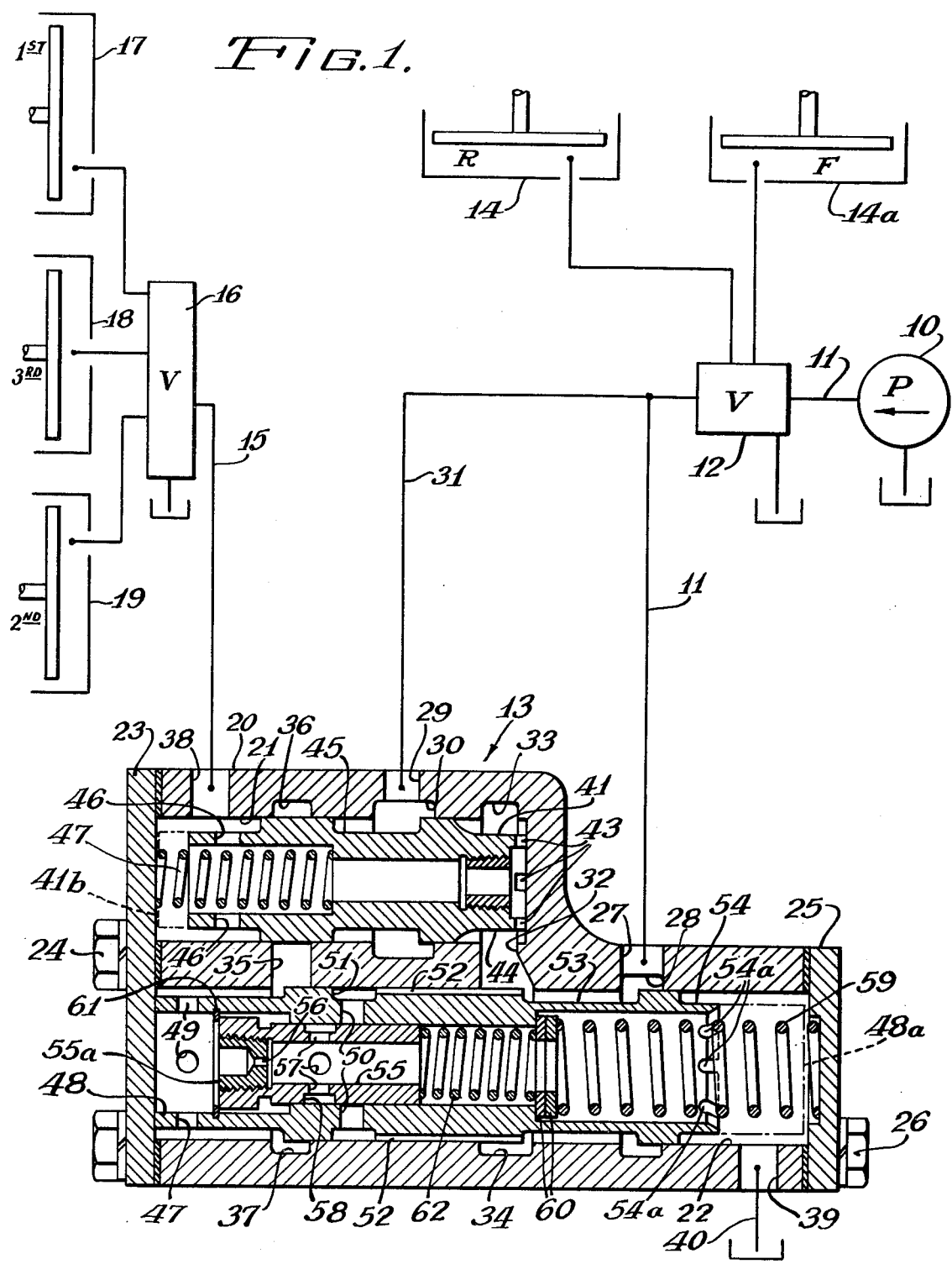
FIG. 1 is a combination sectional and diagrammatic view showing the hydraulic mechanism of the invention in its final position and the connections of the hydraulic mechanism to a pressure fluid source, drain, and power units for direction and speed clutches of the transmission.

As shown in FIG. 1, hydraulic fluid under pressure is supplied from a source such as a pump 10 through a line 11 to a valve 12 connected in the line 11 and to an hydraulic mechanism 13. The valve 12 permits the pressure fluid to flow through the line 11 to the hydraulic mechanism 13, and selectively to an hydraulic power unit 14 or to an hydraulic power unit 14a, one of the units 14 and 14a actuating a clutch (not shown) for forward drive of a tractor (not shown) by a transmission (not shown). The other of the units 14 and 14a actuates the clutch (not shown) for reverse drive.

From the mechanism 13 the pressure fluid flows through line 15 to a valve 16 and thence selectively to hydraulic power units 17, 18 and 19 operating clutches (not shown) for the first, second or third speed of the tractor transmission. It is to be understood that a controller (not shown) acts simultaneously against valves 12 and 16, with six positions of the controller determining the setting of the tractor transmission in forward or reverse at first, second or third speed. The pressure fluid reaches clutch engagement pressure in the power unit 14 or 14a for forward or reverse comparatively quickly, whereas mechanism 13 causes the fluid in the power unit 17, 18, or 19 for first, second or third speed to reach clutch engagement pressure more slowly, as will presently be apparent. Thus the desired objective is reached of actuating the direction clutch before the speed clutch.

The mechanism 13 includes a body 20 having parallel spaced apart cylindrical bores 21 and 22. The bore 21 has a blind or closed end in the body 20, and the other end is closed by a plate 23 secured by screws 24 to the body 20. The bore 22 is relatively long and extends all the way through the body 20, being closed at one end by the plate 23 and at the other end by a plate 25 secured to the body 20 by screws 26. The body has an inlet passage 27 to which the line 11 is connected and which connects with the bore 22 through a peripheral groove formed on the bore 22 at a region near but spaced from the end of the bore 22 where the plate 25 is located.

An inlet passage 29 formed in the body 20 is connected with the bore 21 through a peripheral groove 30 formed on a region near but spaced from the blind end of the bore 21. The inlet passage 29 is connected with the line 11 by a line 31. A connecting passage 32 between the bores 21 and 22 is connected to the blind end of the bore 21 by a peripheral groove 33 formed thereon and to the bore 22 through a peripheral groove 34 located at an intermediate region of the bore 22 farther from the cover plate 25 than the peripheral groove 28.

A connecting passage 35 between the bores 21 and 22 is connected to the bore 21 through a peripheral groove 36 on the bore 21 and to the bore 22 through a peripheral groove 37 on the bore 22. The groove 36 is between and spaced from the groove 30 and the end of the bore 21 closed by the cover 23, and the groove 37 is near but spaced apart from the end of the bore 22 closed by the cover 23. The line 15 is connected to the body 20 at an outlet passage 38, which opens into the bore 21 at a region thereof near the end covered by the plate 23 and closer thereto than the connecting passage 35. The bore 22 has, adjacent the end where the plate 25 is located, a drain passage 39 to which a drain line 40 is connected.

A quick-fill spool 41 is mounted in the bore 21 and has at its end adjacent the blind end of the bore 21 an insert 41a having a relatively large orifice 42, for example, 0.218 inch in diameter. The same end of the spool 41 has peripherally spaced apart notches 43 and an external peripheral recess 44. The quick fill spool 41 has at an intermediate region an external wide annular groove 45. Near the end adjacent the plate 23, the spool 41 has a plurality of peripherally spaced apart side openings 46. A cylindrical coil spring 47 acts between the plate 23 and the spool 41 at an internal shoulder thereon facing and spaced apart from the end of the spool 41 near the plate 23, to urge the spool 41 to the retracted position as shown in solid lines in FIG. 1, in which the spool 41 engages the blind end of the bore 21.

A rate of rise spool 48 is positioned in the bore 22 and has adjacent its end at the plate 23 a plurality of peripherally spaced apart lateral openings 49. At an intermediate region, the spool 48 has a plurality of circumferentially spaced apart side openings 50 and an external annular groove 51 communicating with the outer ends of the openings 50. The openings 50 and groove 51 are spaced apart from the end of the spool 48 at plate 23, but are closer to that end than the other end of the spool.

Two diametrically opposed external narrow shallow channels 52 formed on the spool 48 extend longitudinally thereof from the groove 51 in a direction away from the plate 23. The channels 52 may be, for example, ⅛ inch wide and 1/16 inch deep, and are of appreciable length, for example, 1¼ inch. A wide exterior annular groove 53 is formed on the spool 48 at the ends of the channels 52 remote from the groove 51. The groove 53 is somewhat deeper than the channels 52. The side of the groove 53 remote from the channels 52 is near but spaced apart from an external peripheral recess 54 which is formed on the end of the spool 48 adjacent the plate 25. That end of the spool 48 also has a plurality of peripherally spaced apart notches 54a formed therein.

A poppet 55 is mounted in the spool 48 and carries at its end adjacent the plate 23 an insert 55a having a relatively small orifice 56, for example, 0.045 inch in diameter. The poppet 55 has a plurality of peripherally spaced apart side openings 57 and an external annular groove 58 in which the outer ends of the openings 57 terminate.

The spool 48 is held in the retracted position as shown in solid lines in FIG. 1, involving engagement of one end of the spool with the plate 23, by means of a cylindrical coil spring 59 which acts between the plate 25 and a pair of washers 60 resting against an internal shoulder on the spool 48 facing and spaced apart from the end thereof near the plate 25. The poppet 55 is held in the position as shown in solid lines in FIG. 1 with respect to the spool 48 by means of a split ring 61 engaging one end of the poppet 55 and an internal groove in the spool 48, and a cylindrical coil spring 62 acting against the other end of the poppet 55 and a pair of washers 60.

SPOOLS 41, 48 OPERATE IN FOUR MOVEMENTS

In operating the speed clutches through the valve 16 in a way to allow the direction clutches 14 and 14a to engage first, the spools 41 and 48 execute four movements in the mechanism 13. Specifically, the mechanism 13 fills the selected speed clutch as a two-stage operation with a movement of one spool occurring in each stage. The mechanism 13 makes final engagement of the speed clutch also as a two stage operation with one spool movement in each stage.

TWO MOVEMENTS FOR FILLING

Fluid flow in the orifice 42 carried thereby creates pressure against the end face of the recess 44 thereof, shifting the spool 41 concerned into a leftward position as shown by broken lines 41b in FIG. 1. Fluid flow causing that leftward shift is in a path leading from the line 11, through passage 27, groove 28, groove 53, passage 32, notches 43, interior of spool 41, openings 46, passage 38, line 15, and valve 16, thence into the selected clutch cylinder. That leftward shift constitutes the movement of the first stage of valve operation for clutch filling, enabling spool 41 to intercommunicate the line 31 with each of the groove 33 and the passage 35.

Pressure fluid flowing in the orifice 56 carried thereupon creates pressure against the ported (49) end thereof, shifting the rate of rise spool 48 into the rightward position as shown by broken lines 48a in FIG. 1. Fluid flow causing that rightward shift is in a path leading from the line 31, through the passage 29, groove 45, passage 35, port 49, orifice 56, bore 55, notches 54a, and passage 39, thence into the drain. The rightward shift causes the spool 48 to intercommunicate the line 11 with the passage 32 by way of the grooves 52, and constitutes the movement of the second stage of valve operation for clutch filling.

A supplemental path also opens for fluid flow attendant with the second phase of filling, the supplemental path leading from the line 31, through the passage 29, groove 30, recess 44, groove 33, orifice 42, interior of spool 41, ports 46, passage 38, line 15, and valve 16, thence into the selected clutch. The clutch filling operation is speeded up by the supplemental flow.

TWO-STAGE OPERATION FOR CLUTCH ENGAGING PRESSURE

Decreased fluid flow through the orifice 42 carried thereby relieves pressure on the end recess 44 thereof, enabling the spring 47 to shift the spool 41 concerned rightwardly into the solid line position 41 as shown in FIG. 1. The fluid flow for that rightward shift decreases so as to relieve the pressure at 44 when the selected clutch is practicably filled, and the movement of the first stage for clutch engagement occurs with that rightward shift.

Decreased fluid flow through the orifice 56 carried thereupon relieves pressure on the ported (49) end thereof, enabling the spring 59 to shift the spool 48 concerned leftwardly into the solid line position 48 as shown in FIG. 1. That leftward return shift takes place as a long second stage operation productive of clutch engaging pressure. It is a slow return because fluid is trapped at the end in passage 35, ports 49, and the orifice 56, which orifice only slowly bleeds off the trapped fluid through the bore 55, notches 54a, and passage 39, thence into drain.

SLOW RETURN OF SPOOL 48

During the relatively slow return of the spool 48 to the final position shown in solid lines in FIG. 1, the longitudinal grooves 52 on the spool 48 move with respect to the connecting passage 32 in the body 20. Gradually the part of the length of the grooves 52 connected between the annular groove 53 and the connecting passage 32 and thus between the pump 10 and the selected clutch 17, 18 or 19 becomes smaller until finally, in the solid line position of FIG. 1, the longitudinal grooves 52 in no way intervene in the connection between the pump and the selected clutch.

At the same time, that remaining portion of the longitudinal grooves 52 becomes greater which lies between the connecting passage 32 and the openings 50 and 57 in the spool 48 and poppet 55 leading to drain, so that as viewed relative to drain the pressure in the connecting passage 32 increases progressively above drain pressure. Finally drain is cut off as the openings 50 and 57 in the spool 48 and poppet 55 move out of communication with one another when firstly the spool 48 and later the poppet 55 have returned to the retracted or final solid line position of FIG. 1.

Because the orifices are in the form of constant cross section grooves 52, and because the grooves are straight and parallel to the spool movement, the comparative shortness of movement as shown in the case illustrated in FIG. 1 results in the pressure tapped off at 32 varying only approximately linearly with the movement. True linearity is desired, i.e., with uniform rate of movement of the spool the pressure increases as a straight line function viewed graphically, thus applying clutch engaging pressure for smooth engagement.

CLOSE TO LINEAR VARIATION

If the grooves 52 are modified so as to increase gradually in depth from the end intersecting the groove 51 to the end intersecting the groove 53, a rate of rise can be achieved in some cases which is more nearly linear with movement. That is to say, after the rise starts the pressure use will eventually accelerate through the tapered depth grooves into the selected clutch cylinder in comparison to the uniform depth grooves 52, as the returning spool 48 more closely approaches its leftward final position as shown in solid lines in FIG. 1. This eventual acceleration of rate of rise of fluid pressure is due to the fact that the increasing depth of the grooves 52 produces a decreasing pressure loss per unit of length of the grooves 52 when considered in a direction toward the fluid line 11, i.e., rate of rise keeps changing and the fastest rate of pressure rise occurs upon terminal movement of the spool leftwardly to its return position.

A similar result will be reached if, from the initial size shown for the uiform width grooves 52, the width of such grooves is made to increase slightly progressively in a direction from the groove 51 to the groove 43. That is to say, the terminal portion of the leftward return movement of the spool will be marked by an accelerating pressure increase.

MODIFICATION — FIGURE 2

Figure 2:
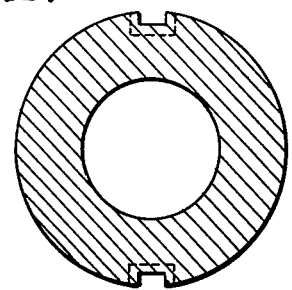
FIG. 2 shows in cross-section a modified shiftable restriction.

It is also possible to achieve this same result by having both the widths and the depths of the grooves increase as at 52a in a direction from the groove 51 to the groove 53, as shown in the modification according to FIG. 2.

In the hereinabove referred to case in which the spool 48 took 0.6 second for full travel at constant speed for increasing clutch pressure from 30 psi to 250 psi, the constant cross section grooves 52 thereof actually produced minor clutch pressure increase during major travel at outset and when rapidly brought up the clutch pressure to 250 psi in the terminal end of travel. In that case when encountered, it is desirable, contrary to the foregoing three examples, to form the grooves with increasing cross section, preferably at a uniform rate of increase, in a direction from the groove 53 to the groove 51. Hence there will be an increasing pressure loss per unit of length of the grooves when considered in a direction toward the fluid line 11, i.e., a good portion of the pressure increase will occur at outset of the return movement of the spool so that with respect to a graphical straight line the rise will be more nearly linear. An increasing groove depth, or width, or both will produce the desired increase in cross section from 53 to 51.

CLOSER TO LINEAR VARIATION — FIGS. 3, 4, 5

Figure 3:
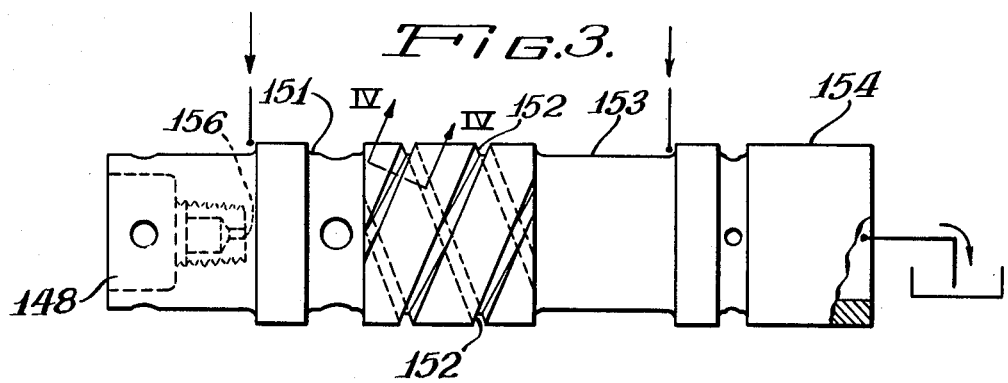
FIGS. 3 and 4 show in longitudinal view and transverse cross section a further modification.
Figure 4:
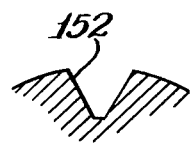
Figure 5:
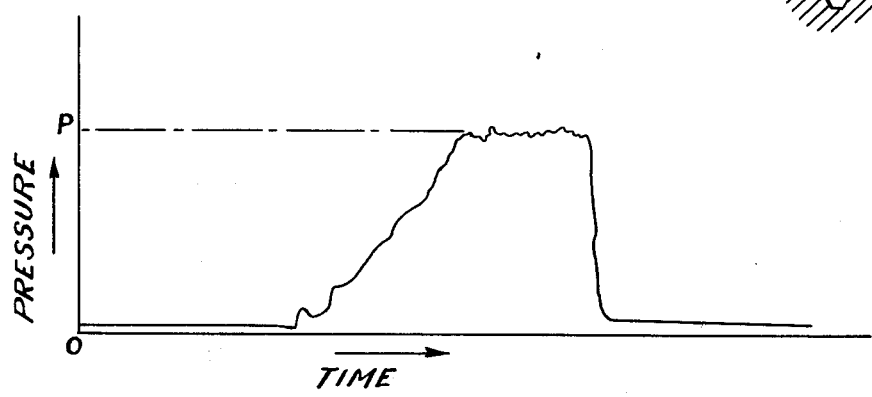
FIG. 5 is an oscillograph of a pressure-time trace on the output of the modification of FIG. 3.

In the use of that preferred embodiment of my invention which is shown in FIGS. 3, 4, and 5, it has been discovered that the pressure changes achieved come even closer to having linear variation with constant rate of movement. A valve spool 148 fits in essentially the environment of the valve spool 48 previously described and has some minor differences of no essential importance. One minor difference is that the end portion 154 has constant outside diameter throughout its length, and the screwed-in insert having the orifice 156 is directly instead of indirectly carried by the spool 148 to which it is screwed.

The spool 148 has a major difference in the respect that, between the grooves 151 and 153 thereof, two grooves 152 are formed as a double helix on the valve land with each groove 180° out of phase with the other groove and with the same lead angle and parallel thereto. The grooves 152 at one end intersect the groove 151 and at the opposite end intersect the groove 153, and the spool 148 is shown in the final position to which it is returned.

In cross section (FIG. 4), each groove is illustrated with a 60° V-shape and has constant cross section from end to end. Compared to grooves parallel to the path of spool movement, the grooves 152 form a considerable lead or pitch angle to the path of movement and consequently have a greatly extended length effective as the spool moves linearly in a direction to uncover the cylinder output, not shown. Each of the grooves is approximately 360° in angular measurement and they together define long orifice means effective to afford pressure changes closer to a linear variation.

Novelty is felt to reside in linearly moving, at constant rate, the helixed spool 148 in the direction of one end thereof relative to a pressure tap point which is more proximal than the said one end, the dynamic relation being such that the pressure tap point is linearly positioned from said one end by distances along the length of the helix yielding tapped off pressures the magnitude of which are formed as a substantially linear function of the distance. Thus I am able to direct pressure developed by fluid flow in a first fluid path from the tap point to a working element, and able to insert a portion of the helix in the first path to restrict the element working pressure to a linear rate of rise for linear rate of actuating the working element, and able to direct flow in a second fluid path from the tap point along the remaining portion of the helix to drain.

A pressure-time trace of the helix action is reproduced from an oscillograph in FIG. 5. The essentially straight line trace peaking at the final pressure P (250 psi) confirms the essential linearity of pressure increase with a double helix. The configuration is such that the length of a helical groove, or grooves in the illustrated example is a multiple of the length of the land portion on which the helical groove is formed. So there need be only a relatively small longitudinal movement of the land portion to produce a relatively large movement along the helical groove of the pressure takeoff point. Thus, a little movement of the spool carrying the land produces a big but nevertheless linearly proportional change in pressure.

The pressure output control thus far described as an illustrative embodiment of the invention has the dynamic characteristic of being automatically pressure movable at a constant rate to cause the indicated variance in output pressure. But automatic movement is not essential in applying the principles hereof nor is constant movement essential because adjustment to static positions allows certain advantages of the invention to be realized. To illustrate the latter, the invention can be readily embodied in a pressure signal generator which is adjustable by linear shift of a pressure tap point.

PRESSURE SIGNAL GENERATOR — FIGS. 6, 7

In a pressure signal generator 208 as shown, a pump 210 supplies pressure fluid through a line 211 connected to a valve body 220 of the generator. The valve body 220 is closed at one end and has a long bore 222 therein, formed with a peripheral groove 228 to which the line 211 is connected.

A tap line providing an output 232 is connected to the bore 222 through a peripheral groove 234 at one side of the groove 228, and a tap line forming a pressure output 232a is connected to the bore 222 through a peripheral groove 234a in the bore. The pump 210 draws from a drain 240 connected both to one end of the bore 222 and to the interior of the spool 248, and the pump and drain together form a source of high and low pressure for the pressure signal generator 208.

A longitudinally slidable spool 248 having left and right lands as viewed in FIG. 6 is formed with a plurality of circumferentially spaced apart side openings 250 and an external annular groove 251 communicating with the outer ends of the openings 250. The openings 250 and the groove 251 are adjacent the left spool but outwardly thereof. Two narrow shallow grooves 252 formed as a double helix on the left land of the spool 248 communicate at their outer end with the groove 251 and communicate at their inner end with a wide exterior annular groove 253 on the spool 248. Two similar narrow shallow external grooves 252a are formed as a double helix on the right land and communicate at their inner end with the groove 253 and at their outer end with the drain 240. The grooves illustrated each have an angle of wrap or angular length of about 430°. The spool 248 is hollow at the end, having a central bore 255 intercommunicating the groove 251 and drain 240.

The spool 248 is a solid cylinder between the groove 251 and the adjacent extremity, and the adjacent extremity is secured by a pivot 256 to an intermediate portion of an operator's lever 258 having a handle, not shown. A pin and slot connection 260 at the bottom of the lever 258 as viewed in FIG. 6 provides a fixed fulcrum for manually adjusting the spool 248 longitudinally as the lever 259 pivots in a vertical plane between various positions such as broken line retracted position 258a.

One of the grooves 252a is illustrative of the double helix grooves, and is generally V-shaped as seen in FIG. 7 with the opposite sides of the groove having an included flair angle of 60°.

When the operator moves the lever from the position shown by the broken lines 258a into the solid line position 258, the left land as viewed in FIG. 6 of the spool 248 moves from an intermediate covering position into a position uncovering the pressure output 232 in the body 220. The uncovering end of the land is always at the low pressure of the drain 240 and, in any position leading toward the uncovering position shown in solid lines, the tapped off pressure in output 232 has a linear relationship to the distance of the tap away from the uncovering end. That is to say, the closer the uncovering end comes to the tap the closer the output comes to drain pressure. Or viewed the other way, magnitude of the output pressure (above drain pressure) and magnitude of the distance (between tap and uncovering end) increases linearly to one another, up to 250 psi pressure or to whatever high pressure is being supplied by the source.

If the pressure from output 232 or from outputs 232 and 232a is supplied to a wave responsive hydraulic mechanism, then a continuous wave or portions thereof are generated by the generator 208 attendant upon a controlled rate of oscillatory movement being imparted to the lever 258. But static pressure is equally readily available from the output 232 or from the outputs 232 and 232a by positioning the handle 258 and the spool 248 at some linear setting. The output or outputs are simply separately connected to closed sub chambers, closed for example by a diaphram or a pressure movable spool valve part at the chamber end. Such chambers can serve as pressure comparator chambers and reach a satisfied position only when the output pressures just referred to on a side are equally and oppositely matched by a pressure such as freeback pressure applied to the opposite side of the chamber closing diaphram or valve spool part. That is, the comparator strives for sameness of pressure as its purpose. Comparators are common in hydraulic control mechanisms which are known and which, because they form no per se part of my invention, are not illustrated.

If the connection between the fixed groove 228 and the fixed output 232a be considered as a first passage with fixed end points so included therebetween, the first passage physically would appear to have fixed length. A second passage between the output 232a and the drain 240 physically would also appear to have fixed length. The appearances of these passages are obviously illusions because their effective length, and the pressure drop caused, increase with the amount of grooved land inserted therein.

It is to be understood that any attempt at analogy between the instant potentiometer for hydraulic use and two complementary variable resistances for hydraulic use is illusory. Such resistances can be tied together at one end to a common ground or drain and varied solely to produce a resistance drop differential or resistance drop ratio therebetween. But it is difference which is the purpose for grounding the two variable resistances at one end, whereas one major achievement of the instant invention is the precise equal and opposite matching of pressures, to reach a satisfied position which can be achieved in a comparator sub-chamber connected in my hydro potentiometer output.

I claim:

1. Procedure involving a control spool having a double helix defined by two helical grooves on the surface of the spool so as to form long orifice means, for use with a source of fluid pressure and a drain to collect spent pressure fluid, for utilizing modulation in the operation of a work performing element so as to actuate same by pressure having an essentially linear rate of rise, comprising the steps of:

directing pressure developed by fluid flow in a first fluid path to the work performing element;

inserting in the first fluid path a control spool with long orifice means defined by two surface helical grooves of general V-shape in cross section, and forming a double helix with the grooves 180° out of phase with one another and with the same lead angle, by connecting a portion of the length of the orifice means defined by the double helix in the first path for restricting rate of rise of pressure to the work performing element to limit the rate of actuating same;

directing flow in a second fluid path from the remaining portion of the length of the orifice means defined by the double helix to drain;

said procedure further characterized by tapping pressure from a pressure tap point communicatively intersecting the orifice means, said tap point to the orifice means defined by the double helix defining the junction between the first and second paths and locatable with respect to the one end of the length of the orifice means defined by the double helix connected to drain, the characteristic of said location of the pressure tap point from said one end being such that the tap point at any given distance along the length of the orifice means defined by the double helix yields a tapped off pressure the magnitude of which is formed as a substantially linear function of the distance;

connecting the tap point to the work performing element;

causing relative movement at a constant rate of the pressure tap point with respect to the tapped orifice means defined by the double helix so that said one end of the latter and said point separate at a constant rate, insuring that the tapped off pressure to the work performing element has a rapid, essentially linear rate of rise, said work performing element comprising a fluid motor; and restricting the second fluid path into drain to yield an initially tapped off motor pressure of approximately 30 psi, the transition due to said rapid, essentially linear rate of raising motor pressure being from the 30 psi to approximately 250 psi final motor pressure and occurring within about one-half second.

* * * * *